United States Patent
Fu et al.

(10) Patent No.: US 12,141,306 B2
(45) Date of Patent: Nov. 12, 2024

(54) INTEGRITY AUDITING FOR MULTI-COPY STORAGE

(71) Applicant: Nokia Technologies Oy, Espoo (FI)

(72) Inventors: Anmin Fu, Xi'an (CN); Jingyu Feng, Xi'an (CN)

(73) Assignee: NOKIA TECHNOLOGIES OY, Espoo (FI)

(*) Notice: Subject to any disclaimer, the term of this patent is extended or adjusted under 35 U.S.C. 154(b) by 339 days.

(21) Appl. No.: 17/626,422

(22) PCT Filed: Jul. 18, 2019

(86) PCT No.: PCT/CN2019/096605
§ 371 (c)(1),
(2) Date: Jan. 11, 2022

(87) PCT Pub. No.: WO2021/007863
PCT Pub. Date: Jan. 21, 2021

(65) Prior Publication Data
US 2022/0318415 A1 Oct. 6, 2022

(51) Int. Cl.
*G06F 21/62* (2013.01)
*G06F 21/60* (2013.01)
(Continued)

(52) U.S. Cl.
CPC ........ *G06F 21/6218* (2013.01); *G06F 21/602* (2013.01); *G06F 21/64* (2013.01);
(Continued)

(58) Field of Classification Search
CPC .... G06F 21/6218; G06F 21/602; G06F 21/64; G06F 2221/2101; G06F 21/645; H04L 9/0866; H04L 67/1097
See application file for complete search history.

(56) References Cited

U.S. PATENT DOCUMENTS 8,621,240 B1 * 12/2013 Auchmoody ....... G06F 21/6272
713/193
10,673,625 B1 * 6/2020 Behnia .................. H04L 9/3073
(Continued)

FOREIGN PATENT DOCUMENTS

CN 103218574 A 7/2013
CN 104281534 A * 1/2015
(Continued)

OTHER PUBLICATIONS

Yu et al., "Networking for big data: a survey", IEEE Communications Surveys & Tutorials, vol. 19, No. 1, Firstquarter 2017, pp. 531-549.
(Continued)

*Primary Examiner* — Darren B Schwartz
(74) *Attorney, Agent, or Firm* — ALSTON & BIRD LLP

(57) ABSTRACT

A method for integrity auditing is provided. The method comprises: generate a challenge message for verifying data integrity of a file stored at a storage server (510); send the challenge message to the storage server (520); receive, from the storage server, a proof on the data integrity of the file, the proof being generated based on the challenge message (530); verify the data integrity of the file by verifying validity of the proof (540). In this way, integrity auditing for multi-copy storage can be enabled, where the overhead in updating data is independent of the number of copies of the data.

20 Claims, 9 Drawing Sheets

(51) Int. Cl.
  *G06F 21/64* (2013.01)
  *H04L 9/08* (2006.01)
  *H04L 67/1097* (2022.01)

(52) U.S. Cl.
  CPC ........ *H04L 9/0866* (2013.01); *H04L 67/1097* (2013.01); *G06F 2221/2101* (2013.01)

(56) References Cited

U.S. PATENT DOCUMENTS

| | | | |
|---|---|---|---|
| 2011/0040980 A1* | 2/2011 | Kerr | G06F 21/6245 726/28 |
| 2012/0209822 A1 | 8/2012 | Prabhakar et al. | |
| 2012/0290837 A1 | 11/2012 | Vion-Dury | |
| 2014/0298010 A1 | 10/2014 | Ryan | |
| 2017/0153819 A1 | 6/2017 | Zeng et al. | |
| 2020/0358622 A1* | 11/2020 | Yoshida | H04L 9/0869 |

FOREIGN PATENT DOCUMENTS

| | | | | |
|---|---|---|---|---|
| CN | 104811450 A | * | 7/2015 | ........... H04L 63/123 |
| CN | 104899525 A | * | 9/2015 | ............. G06F 21/64 |
| CN | 107612687 A | | 1/2018 | |
| CN | 107612969 A | | 1/2018 | |
| CN | 108229208 A | * | 6/2018 | ........... G06F 21/645 |

OTHER PUBLICATIONS

Yu et al., "Big privacy: challenges and opportunities of privacy study in the age of big data", IEEE Access, vol. 4, Jun. 6, 2016, pp. 2751-2763.

Zhou et al., "Data Integrity Verification of the Outsourced Big Data in the Cloud Environment: A Survey", Journal of Network and Computer Applications, vol. 122, Nov. 15, 2018, pp. 1-15.

Yang et al., "Secure and verifiable policy update outsourcing for big data access control in the cloud", IEEE Transactions on Parallel and Distributed Systems, vol. 26, No. 12, Dec. 1, 2015, pp. 3461-3470.

Aujla et al., "SecSVA: Secure storage, verification, and auditing of big data in the cloud environment", IEEE Communications Magazine, vol. 56, No. 1, Jan. 2018, pp. 78-85.

Ateniese et al., "Provable data possession at untrusted stores", Proceedings of the 14th ACM conference on Computer and communications security, Oct. 2007, pp. 598-609.

Wang et al., "Enabling public auditability and data dynamics for storage security in cloud computing", IEEE Transactions on Parallel and Distributed Systems, vol. 22, No. 5, May 2011, pp. 847-859.

Wang et al., "Provable Data Possession with Outsourced Data Transfer", IEEE Transactions on Services Computing, vol. 14, No. 6, Nov.-Dec. 1, 2021, pp. 2000-2010.

Curtmola et al., "MR-PDP: Multiple-replica provable data possession", The 28th International Conference on Distributed Computing Systems, Jun. 17-20, 2008, pp. 411-420.

Barsoum et al., "On verifying dynamic multiple data copies over cloud servers", IACR Cryptology ePrint Archive, Aug. 15, 2011, pp. 1-30.

Liu et al., "MuR-DPA: Top-down levelled multi-replica merkle hash tree based secure public auditing for dynamic big data storage on cloud", IEEE Transactions on Computers, vol. 64, No. 9, Sep. 1, 2015, pp. 2609-2622.

Li et al., "FMR-PDP: Flexible multiple-replica provable data possession in cloud storage", IEEE Symposium on Computers and Communications (ISCC), Jul. 3-6, 2017, 7 pages.

Peng et al., "Identity-based public multi-replica provable data possession", IEEE Access, vol. 5, Nov. 22, 2017, pp. 26990-27001.

Indian Application No. 201841042685, "Certificateless Remote Data Integrity Checking in Cloud Storage using Lattices", filed on Nov. 13, 2018, 28 pages.

Sonawane et al., "Efficient Public Auditing Scheme for Shared Cloud Data Storage Using Multi Replica Merkel Hash Tree", International Journal of Advanced Research in Computer and Communication Engineering, vol. 5, No. 7, Jul. 2016, pp. 373-378.

Yang et al., "Certificateless Provable Group Shared Data Possession with Comprehensive Privacy Preservation for Cloud Storage", Future Internet, MDPI, vol. 10, No. 6, 2018, pp. 1-17.

International Search Report and Written Opinion received for corresponding Patent Cooperation Treaty Application No. PCT/CN2019/096605, dated Apr. 20, 2020, 10 pages.

Extended European Search Report received for corresponding European Patent Application No. 19938102.1, dated Feb. 28, 2023, 11 pages.

* cited by examiner

INTEGRITY AUDITING FOR MULTI-COPY STORAGE

RELATED APPLICATION

This application was originally filed as PCT Application No. PCT/CN2019/096605, filed on Jul. 18, 2019, of which is incorporated herein by reference in its entirety.

TECHNICAL FIELD

Embodiments of the present disclosure generally relate to the field of data management, and in particular, to methods, apparatuses and computer readable storage media for integrity auditing.

BACKGROUND

In the era of big data, the amount of data is increasing explosively, and users can no longer manage data well by relying on traditional methods. The emergence of cloud computing provides a new way out for the dilemma. Cloud computing provides users with obvious advantages, such as, flexible storage, location-independent on-demand access services, high reliability, and so on. However, users may no longer manage the data on the cloud as they process data locally. Although a cloud storage server may claim that users' data has been stored correctly, the security of data in the cloud may still be questioned. One reason is that the cloud storage server may deliberately delete data that is not accessed or rarely accessed in order to save storage space. The other reason is that software or hardware errors and human mistakes can also lead to data damage in the cloud. Therefore, a mechanism is needed to enable users to check the integrity of data stored in the cloud.

SUMMARY

In general, example embodiments of the present disclosure provide methods, apparatuses and computer readable storage media for integrity auditing.

In a first aspect, there is provided an apparatus. The apparatus comprises at least one processor; and at least one memory including computer program codes; the at least one memory and the computer program codes are configured to, with the at least one processor, cause the apparatus to divide a file to be stored at a storage server into a plurality of data blocks; generate at least one copy for each of the plurality of data blocks, the number of the at least one copy being associated with importance of the data block; generate, based on copies of the plurality of data blocks and a first private key of the apparatus obtained from a key generation center, respective tags for the plurality of data blocks and a first file signature for the file; and send the copies of the plurality of data blocks, the tags of the plurality of data blocks and the first file signature to the storage server for storing the file at the storage server.

In a second aspect, there is provided an apparatus. The apparatus comprises at least one processor; and at least one memory including computer program codes; the at least one memory and the computer program codes are configured to, with the at least one processor, cause the apparatus to generate a challenge message for verifying data integrity of a file stored at a storage server by a client, the file comprising a plurality of data blocks, each data block comprising at least one copy and having a tag generated based on the at least one copy, and the number of the at least one copy being associated with importance of the data block; send the challenge message to the storage server; receive, from the storage server, a proof on the data integrity of the file, the proof being generated based on the challenge message; and verify the data integrity of the file by verifying validity of the proof.

In a third aspect, there is provided an apparatus. The apparatus comprises at least one processor; and at least one memory including computer program codes; the at least one memory and the computer program codes are configured to, with the at least one processor, cause the apparatus to receive, from a further apparatus, a challenge message for verifying data integrity of a file stored at the apparatus by a client, the file comprising a plurality of data blocks, each data block comprising at least one copy and having a tag generated based on the at least one copy, and the number of the at least one copy being associated with importance of the data block; generate, based on the challenge message, a first proof on the data integrity of the file; and send the first proof to the further apparatus.

In a fourth aspect, there is provided a method. The method comprises dividing a file to be stored at a storage server into a plurality of data blocks; generating at least one copy for each of the plurality of data blocks, the number of the at least one copy being associated with importance of the data block; generating, based on copies of the plurality of data blocks and a first private key of the apparatus obtained from a key generation center, respective tags for the plurality of data blocks and a first file signature for the file; and sending the copies of the plurality of data blocks, the tags of the plurality of data blocks and the first file signature to the storage server for storing the file at the storage server.

In a fifth aspect, there is provided a method. The method comprises generating a challenge message for verifying data integrity of a file stored at a storage server by a client, the file comprising a plurality of data blocks, each data block comprising at least one copy and having a tag generated based on the at least one copy, and the number of the at least one copy being associated with importance of the data block; sending the challenge message to the storage server; receiving, from the storage server, a proof on the data integrity of the file, the proof being generated based on the challenge message; and verifying the data integrity of the file by verifying validity of the proof.

In a sixth aspect, there is provided a method. The method comprises receiving, at a storage server and from a device, a challenge message for verifying data integrity of a file stored at the storage server, the file comprising a plurality of data blocks, each data block comprising at least one copy and having a tag generated based on the at least one copy, and the number of the at least one copy being associated with importance of the data block; generating, based on the challenge message, a proof on the data integrity of the file; and sending the proof to the device.

In a seventh aspect, there is provided an apparatus. The apparatus comprises means for dividing a file to be stored at a storage server into a plurality of data blocks; means for generating at least one copy for each of the plurality of data blocks, the number of the at least one copy being associated with importance of the data block; means for generating, based on copies of the plurality of data blocks and a first private key of the apparatus obtained from a key generation center, respective tags for the plurality of data blocks and a first file signature for the file; and means for sending the copies of the plurality of data blocks, the tags of the plurality of data blocks and the first file signature to the storage server for storing the file at the storage server.

In an eighth aspect, there is provided an apparatus. The apparatus comprises means for generating a challenge message for verifying data integrity of a file stored at a storage server by a client, the file comprising a plurality of data blocks, each data block comprising at least one copy and having a tag generated based on the at least one copy, and the number of the at least one copy being associated with importance of the data block; means for sending the challenge message to the storage server; means for receiving, from the storage server, a proof on the data integrity of the file, the proof being generated based on the challenge message; and means for verifying the data integrity of the file by verifying validity of the proof.

In a ninth aspect, there is provided an apparatus. The apparatus comprises means for receiving, from a further apparatus, a challenge message for verifying data integrity of a file stored at the apparatus, the file comprising a plurality of data blocks, each data block comprising at least one copy and having a tag generated based on the at least one copy, and the number of the at least one copy being associated with importance of the data block; means for generating, based on the challenge message, a proof on the data integrity of the file; and means for sending the proof to the further apparatus.

In a tenth aspect, there is a computer readable storage medium comprising program instructions stored thereon. The instructions, when executed by an apparatus, cause the apparatus to perform the method according to the fourth aspect.

In an eleventh aspect, there is a computer readable storage medium comprising program instructions stored thereon. The instructions, when executed by an apparatus, cause the apparatus to perform the method according to the fifth aspect.

In a twelfth aspect, there is a computer readable storage medium comprising program instructions stored thereon. The instructions, when executed by an apparatus, cause the apparatus to perform the method according to the sixth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
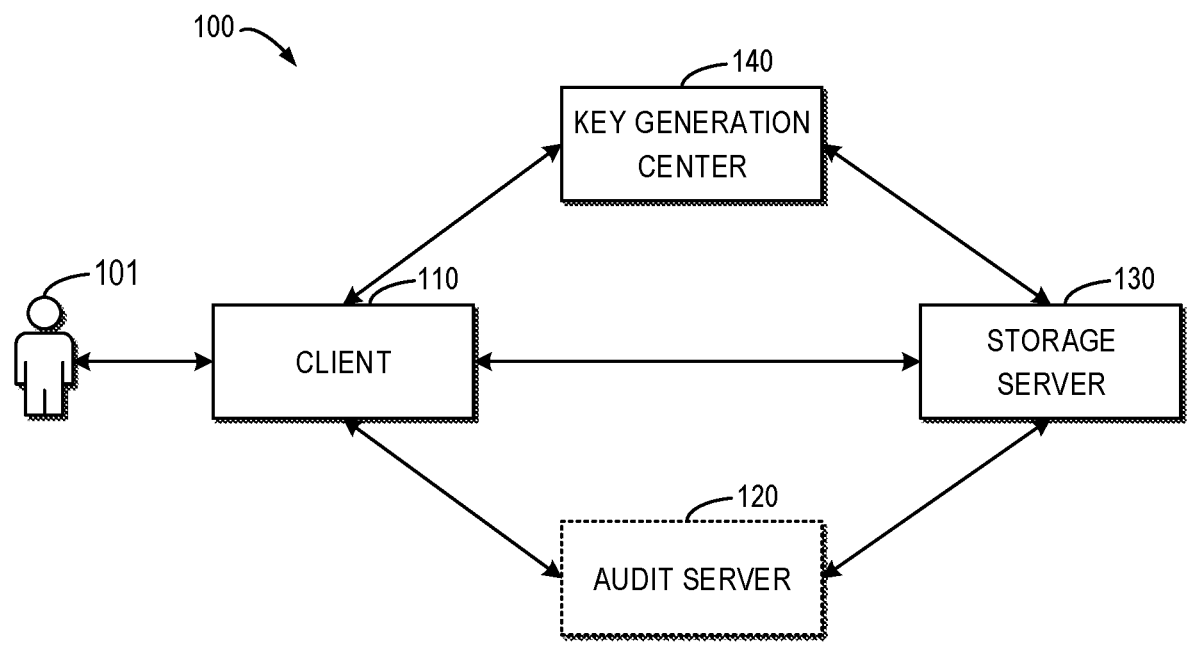
FIG. 1 illustrates a block diagram of an example storage system according to some example embodiments of the present disclosure.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As described above, in the era of big data, the amount of data is increasing explosively, and users can no longer manage data well by relying on traditional methods.

The emergence of cloud computing provides a new way out for the dilemma. Cloud computing provides users with obvious advantages, such as, flexible storage, location-independent on-demand access services, high reliability, and so on. However, users may no longer manage the data on the cloud as they process data locally. Although a cloud storage server (CSS) may claim that users' data has been stored correctly, the security of data in the cloud may still be questioned. One reason is that the CSS may deliberately delete data that is not accessed or rarely accessed in order to save storage space. The other reason is that software or hardware errors and human mistakes can also lead to data damage in the cloud. Therefore, a mechanism is needed to enable users to check the integrity of data stored in the cloud.

In order to resolve above integrity issues in cloud storage, numerous data integrity schemes have been proposed. Generally speaking, integrity auditing schemes can be divided into two categories: private auditing and public auditing. In public auditing, users can not only audit cloud data themselves, but also allow a third party auditor (TPA) instead of the users to interact with a CSS. However, most of current public auditing schemes are mainly directed to single-copy storage. In a single-copy scheme, once the auditing fails, it means that the data in the cloud has been damaged, and the deletion of the local copy makes it difficult to recover the damaged data. Multi-copy storage becomes an inevitable choice to improve data availability and restorability by storing multiple copies of raw data across multiple cloud servers. A notable feature of multi-copy storage is that as long as a copy of the data stored in the cloud remains intact, the damaged data can be completely recovered. However, current multi-copy schemes may only support static data copies. That is, different data blocks of a file may have the same number of copies regardless of respective importance of the data blocks. Inventors of this application have realized that dynamic multi-copy schemes may suffer from security problems or performance defects. Therefore, it is of great significance to propose a dynamic public auditing scheme for multi-copy storage in cloud data storage.

In order to implement public auditing for multi-copy storage, some cryptographic schemes have been conducted to provide integrity guarantees for users. However, these schemes may have different limitations. For example, some schemes are designed based on Public Key Infrastructure (PKI), but the use of certificates makes the deployment of the schemes expensive. Some schemes require the number of copies and the number of data blocks to participate in the generation of the copies, such that data dynamics cannot be supported. Some schemes may have security vulnerabilities. Further, in some schemes, the overhead for updating a data block may increase linearly with the number of copies of the data block.

Embodiments of the present disclosure propose a multi-copy public auditing scheme using certificateless signature, so as to solve the above problems and/or one or more of other potential problems. Specifically, this scheme allows a user to determine the number of copies for each data block according to importance of the data block. An improved MHT is proposed to achieve batch updates of multiple copies of a data block. Moreover, signature exchange verification is enabled to achieve fair arbitration and deal with conflicts between users and storage servers.

Reference is now made to FIG. 1, which illustrates a block diagram of an example storage system 100 according to some example embodiments of the present disclosure. As shown in FIG. 1, for example, the system 100 may include a client 110, an audit server 120, a storage server 130 and a key generation center (KGC) 140. It is to be understood that the structure of the system 100 is shown only for purpose of illustration, without suggesting any limitation to the scope of the present disclosure. Embodiments of the present disclosure may also be applied to a system with a different structure. For example, in some example embodiments, the audit server 120 can be omitted.

The client 110 may be any device operated by a user 101. For example, the client 110 may receive instructions from the user 101 and perform actions based on the instructions from the user 101. Examples of the client 110 may include, but not limited to, a computer, a mobile phone, a wearable device, a home appliance and so on.

In some example embodiments, according to the instructions from the user 101, the client 110 may divide a file to be stored to the storage server 130 into a plurality of data blocks. The client 110 may generate one or more copies for each data block based on importance of the data block. For example, the client 110 may generate a larger number of copies for a data block of higher importance, but generate a smaller number of copies for another data block of lower importance. The client 110 may upload all of the copies of the data blocks into the storage server 130 for storage. To protect data integrity, the client 110 may also generate a tag for each data block based on a private key of the client 110. The client 110 may further generate a file signature for the file based on its private key. The generation of the tags of the plurality of data blocks and the file signature can be based on an improve MHT, which will be described in detail with reference to FIG. 2 in the following. The client 110 may send the tags of the plurality of data blocks and the file signature to the storage server 130 for storage.

In some example embodiments, the audit server 120 may be implemented as a computing device separate from the client 110. The audit server 120 can communicate with both the client 110 and the storage server 130. For example, the audit server 120 may have more computing resources and expertise than the client 110, such that the client 110 can delegate the audit of data integrity to the audit server 120. Alternatively, in some example embodiments, the audit server 120 and the client 110 can be implemented in a same physical device.

In some example embodiments, the client 110 may send, to the audit server 120, a request (also referred to as "first request") for verifying data integrity of a file stored by the client 110 at the storage server 130. In response to the first request, the audit server 120 may generate a challenge message and send the challenge message to the storage server 130. The storage server 130 may generate a proof on the data integrity of the file based on the challenge message and send the proof to the audit server 120. In response to receiving the proof, the audit server 120 may verify validity of the proof, so as to determine whether the file has been stored correctly at the storage server 130. The audit server 120 may send, to the client 110, a response indicating a verification result of the data integrity of the file. Alternatively, in some example embodiments, the audit server 120 can be omitted from the system 100. For example, the challenge message can be generated and sent to the storage server 130 by the client 110. In response to receiving the proof from the storage server 130, the client 110 may verify validity of the proof, so as to determine whether the file has been stored correctly at the storage server 130.

The storage server 130 may include one or more storage devices currently known or to be developed in the future. In some example embodiments, the storage server 130 can be a cloud storage server (CSS), which may be a resource center with powerful computing capabilities and sufficient storage space. The storage server 130 may be responsible for storing and managing data (such as, copies of data blocks of a file) from the client 110 and responding to challenge messages from the client 110 or the audit server 120 at any time. The storage server 130 may convince the client 110 that it is honest in storing user data via an integrity mechanism.

The KGC 140 may be a third party trusted by the client 110 and the storage server 130. The key generation center 140 may generate partial keys for the client 110 and the storage server 130 based on their identities respectively. The KGC 140 cannot forge a valid signature for it only possesses partial keys for selected identities.

As described above, according to example embodiments of the present disclosure, an improved MHT is introduced to enable batch updates of multiple copies of a data block. Both the client 110 and the storage server 130 can maintain such MHT, so as to reduce the overhead for updating a data block with multiple copies.

Figure 2:
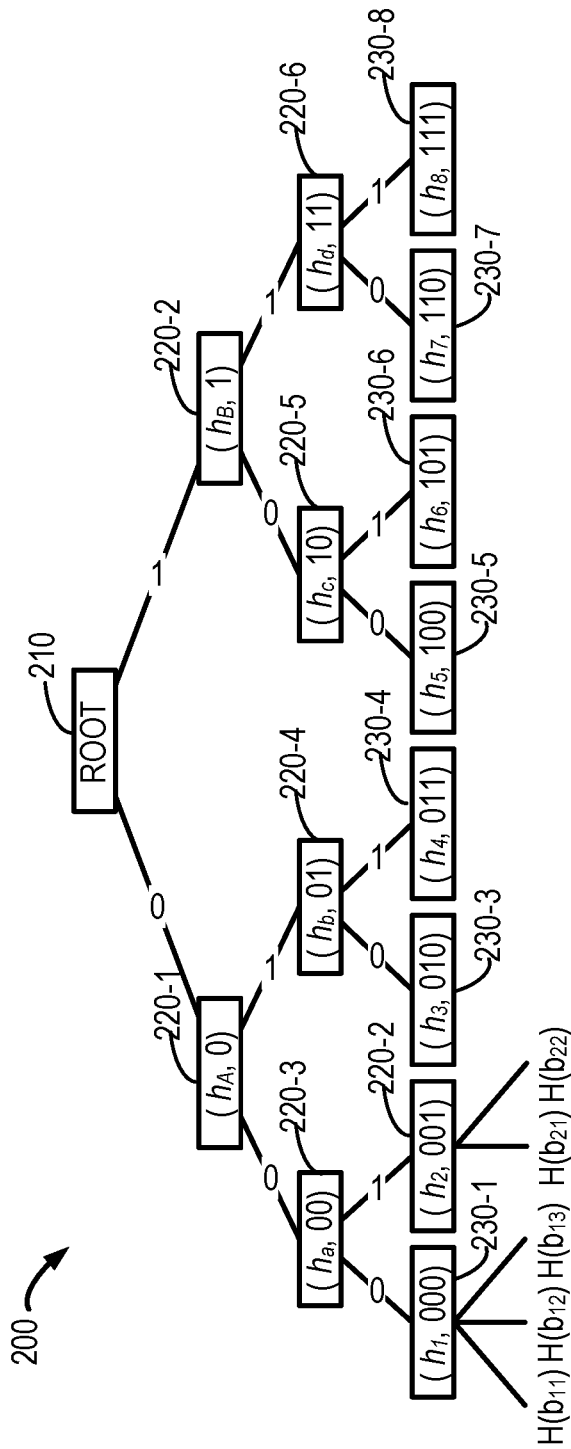
FIG. 2 illustrates a schematic diagram of an example Merkle Hash Tree (MHT) according to some example embodiments of the present disclosure.

FIG. 2 illustrates a schematic diagram of an example MHT 200 according to some example embodiments of the present disclosure. In some example embodiments, the MHT 200 may be constructed by using a cryptographic hash function H.

As shown in FIG. 2, the MHT 200 may comprise a plurality of nodes 210, 220-1, 220-2 . . . 220-6, 230-1, 230-2 . . . 230-8. Each node in the MHT 200 may stores two elements, one of which is a hash value $h_N$ and the other of which is location information $l_N$ of the node in the MHT 200. A leaf node (such as, any of the nodes 230-1, 230-2 . . . 230-8) may correspond to a data block of a file. In some example embodiments, in order to reduce computational overhead, the hash value $h_N$ stored at a leaf node may also be used to calculate the tag of the data block corresponding to the leaf node, such that, only one hash operation is need for each data block when generating the tag and the MHT. For each non-leaf node (such as, any of the nodes 220-1, 220-2 . . . 220-6), the hash value $h_N$ stored at the non-leaf node may be calculated as: $h_N = H(h_{lchildren} \| h_{rchildren} \| l_N)$, where $h_{lchildren}$ represents the hash value stored by a left child node of the non-leaf node, $h_{rchildren}$ represents the hash value stored by a right child node of the non-leaf node and the value of $l_N$ represents the location of the non-leaf node in the MHT 200. For example, as shown in FIG. 2, the non-leaf node 220-3 comprises two child nodes 230-1 and 230-2. The location information of the left child node 230-1 is represented as '000', while the location information of the right child node 230-2 is represented as '001'. Therefore, the location information of the non-leaf node 220-3 is '00', which is the common part in location information of the left and right child nodes. The location information $l_R$ of the root node 210 may be set to null. As such, it is easy to get the hash value and location information of all nodes, so as to construct the MHT as shown in FIG. 2.

A verification path for a node can be defined as the sibling nodes on the path of searching upward from the node to the root node. For example, if a data block corresponding to the leaf node 230-4 is updated, in order to verify validity of the updated data block (such as, a new node ($h_4$, 011)), the verification path {230-3, 220-3, 220-2} can be provided. In this way, the hash value stored at the node 220-4 can be updated as: $h_b = H(h_3 \| h_4 \| l_b)$, where $l_b$ is '01'. The hash values stored at the nodes 220-1 and 210 can be updated similarly.

As shown in FIG. 2, it is assumed that a data block corresponding to the leaf node 230-1 has three copies (for example, represented as $b_{11}$, $b_{12}$ and $b_{13}$), while another data block corresponding to the leaf node 230-2 has two copies (for example, represented as $b_{21}$ and $b_{22}$). The hash values stored at the leaf nodes 230-1 and 230-2 can be calculated respectively as: $h_1 = H(H(b_{11}) \| H(b_{12}) \| H(b_{13}))$ and $h_2 = H(H(b_{21}) \| H(b_{22}))$. That is, each leaf node in the MHT 200 stores a hash value calculated based on all copies of the corresponding data block. As such, the overhead for updating a data block is independent of the number of copies of the data block. Additionally, the MHT 200 as shown in FIG. 2 can support dynamic updates of data blocks with different number of copies.

Based on the improved MHT 200 as shown in FIG. 2, a multi-copy public auditing scheme can be achieved, which can support dynamic batch updates of multiple copies of a data block, and prevent cloud-initiated replacement attacks during the updating. More details will be described as below with reference to FIGS. 3A-3E.

In the following descriptions, it is assumed that $G_1$ and $G_2$ represent two multiplicative groups of prime order q respectively, where q is a large prime. It is also assumed that e is selected as a computable bilinear pairing, which maps the product of two elements on $G_1$ to an element on $G_2$. That is, e: $G_1 \times G_1 \to G_2$. It is assumed that g be a generator of $G_1$. Three cryptographic hash functions H: $\{0,1\}^* \to G_1$, $H_1$: $\{0,1\}^* \to G_1$ and $H_2$: $\{0,1\}^* \to Z_q$ and one cryptographic pseudo-random function $\Psi$: $Z_q \times \{0,1\}^* \to Z_q$ are also predefined, where $Z_q$ represents a range [1, q−1] and $\{0,1\}^*$ represents a binary string with an arbitrary length. The KGC 140 may select a master key $s \in Z_q$ and compute, based on the master key, a system public key $mpk=g^s \in G_1$. The KGC 140 may publish system parameters $\{G_1, G_2, q, e, g, H, H_1, H_2, \Psi, mpk\}$ to both the client 110 and the storage server 130, but keep its master key s secret.

Figure 3A:
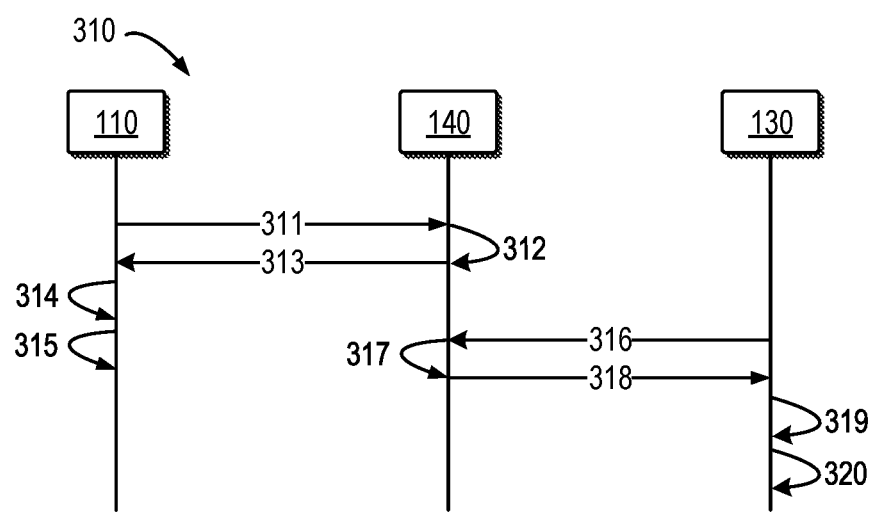
FIG. 3A illustrates an interaction diagram of an example process for obtaining keys from a key generation center according to some example embodiments of the present disclosure.

FIG. 3A illustrates an interaction diagram of an example process 310 for obtaining keys from the KGC 140 according to some example embodiments of the present disclosure. For the purpose of discussion, the process 310 will be described with reference to FIG. 1. For example, the process 310 may involve the client 110, the storage server 130 and the KGC 140 as shown in FIG. 1. It is to be understood that the process 310 may include additional acts not shown in FIG. 3A, or omit some acts shown in FIG. 3A. The scope of the present disclosure is not limited in this aspect.

As shown in FIG. 3A, the client 110 may send 311 an identifier of the client 110 (such as, a binary string identifying the client 110) to the KGC 140. In response to receiving the identifier of the client 110, the KGC 140 may generate 312 a partial private key for the client 110 based on the identifier of the client 110. For example, the partial private key for the client 110 may be calculated as: $ssk_U=H_1(ID_U)^s$, where $ID_U$ represents the identifier of the client 110. The KGC 140 may return 313 the partial private key $ssk_U$ to the client 110. The client 110 may verify 314 validity of the partial private key $ssk_U$. For example, the client 110 may verify the validity of the partial private key $ssk_U$ by checking whether the equation $e(ssk_U,g)=e(H_1(ID_U),mpk)$ can be satisfied. In response to the equation being unsatisfied, the client 110 may determine that the partial private key $ssk_U$ is invalid. Then, the client 110 may request a partial private key from the KGC 140 once again. In response to the equation being satisfied, the client 110 may determine that the partial private key $ssk_U$ is valid. Then, the client 110 may determine 315 its private key $sk_U$ based on the partial private key $ssk_U$ and a selected secret value $x_U \in Z_q$. That is, $sk_U=\{ssk_U,x_U\}$. The client 110 may further determine 315 its public key as: $pk_U=g^{x_U}$.

Similarly, the storage server 130 may send 316 an identifier of the storage server 130 (such as, a binary string identifying the storage server 130) to the KGC 140. In response to receiving the identifier of the storage server 130, the KGC 140 may generate 317 a partial private key for the storage server 130 based on the identifier of the storage server 130. For example, the partial private key for the storage server 130 may be calculated as: $ssk_C=H_i(ID_C)^s$, where $ID_C$ represents the identifier of the storage server 130. The KGC 140 may return 318 the partial private key $ssk_C$ to the storage server 130. The storage server 130 may verify 319 validity of the partial private key $ssk_C$. For example, the storage server 130 may verify the validity of the partial private key $ssk_C$ by checking whether the equation $e(ssk_C, g)=e(H_1(ID_C),mpk)$ can be satisfied. In response to the equation being unsatisfied, the storage server 130 may determine that the partial private key $ssk_C$ is invalid. Then, the storage server 130 may request a partial private key from the KGC 140 once again. In response to the equation being satisfied, the storage server 130 may determine that the partial private key $ssk_C$ is valid. Then, the storage server 130 may determine 315 its private key $sk_C$ based on the partial private key $ssk_C$ and a selected secret value $x_C \in Z_q$. That is, $sk_C=\{ssk_C,x_C\}$. The storage server 130 may further determine 315 its public key as: $pk_C=g^{x_C}$.

Figure 3B:
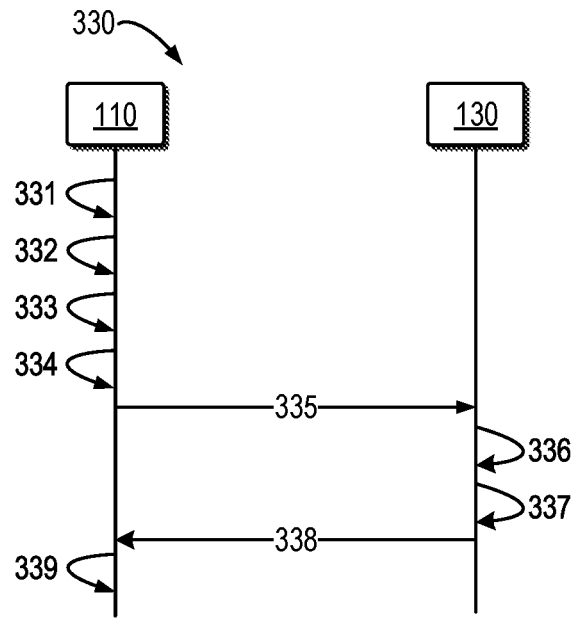
FIG. 3B illustrates an interaction diagram of an example process for storing a file into a storage server according to some example embodiments of the present disclosure.

FIG. 3B illustrates an interaction diagram of an example process 330 for storing a file into a storage server according to some example embodiments of the present disclosure. For the purpose of discussion, the process 330 will be described with reference to FIG. 1. For example, the process 330 may involve the client 110 and the storage server 130 as shown in FIG. 1. It is to be understood that the process 330 may include additional acts not shown in FIG. 3B, or omit some acts shown in FIG. 3B. The scope of the present disclosure is not limited in this aspect.

As shown in FIG. 3B, the client 110 may divide 331 a file F to be stored to the storage server 130 into a plurality of data blocks. The file can be represented as $F=\{b_1, b_2, \ldots, b_n\}$, where $b_i \in Z_q$ and n represents the number of data blocks. The client 110 may select a random name for the file, where $name \in Z_q$. For each data block $b_i$ (where $i \in [1,n]$), the client 110 may generate 332 $m_i$ copies, where $m_i \in [1, m_{max}]$ and $m_{max}$ represents the maximum number of copies supported for one data block. In some example embodiments, the value of $m_i$ may be determined based on importance of the data block $b_i$. For example, the higher the importance of the data block $b_i$, the larger the value of $m_i$. For each data block $b_i$ (where $i \in [1,n]$), the client 110 may select a random value $v_i \in Z_q$ and generate $m_i$ copies $b_{ij}=b_i+\Psi_K(name\|j\|v_i)$, where $j \in [1,m_i]$ and $K=H_2(name\|x_U\|ssk_U)$. It is to be understood that, for any copy $b_{ij}$ of the data block $b_i$, the client 110 can recover the plaintext $b_i=b_{ij}-\Psi_K(name\|j\|v_i)$ easily. It can be seen that the serial number i of the data block is not involved in the generation of the copies for the data block, thereby avoiding label recalculation caused by data updates.

After generating all the copies $b_{ij}$ (where $j \in [1,m_i]$ for an original data block $b_i$, the client 110 may choose a value $u \in G_1$ and generate 333 a tag for the data block $b_i$ based on the private key of the client 110 and all the copies $b_{ij}$ (where $j \in [1,m_i]$) of the data block $b_i$. For example, the tag $\sigma_i$ for the data block $b_i$ can be calculated as: $\sigma_i=ssk_U^{H(M_i)}$.

$$\sigma_i = ssk_U^{H(M_i)} \cdot \left(u^{\sum_{j=1}^{m_i} b_{ij}}\right)^{x_U},$$

where $M_i=H(b_{i1})\| \ldots \|H(b_{ij})\| \ldots \|H(b_{im_i})$. The client 110 may generate a root hash value R based on construction of a MHT (such as, the MHT 200 as shown in FIG. 2) over $M_i$ and generate 334 a file signature $Sig_U=H(R)^{x_U}$ for the file based on the root hash value R. Then, the client 110 may send 335 all of copies of data blocks $\{b_{ij}\}_{1 \leq i \leq n, 1 \leq j \leq m_i}$, all of the tags $\{\sigma_i\}_{1 \leq i \leq n}$ and the file signature $Sig_U$ (also referred to as "first file signature") to the storage server 130 for storage. In some example embodiments, the client 110 may also send the constructed MHT to the storage server 130, such that the storage server 130 can utilize the hash values stored in the MHT without further calculation. Alternatively, in some example embodiments, the storage server 130 may construct a same MHT based on the received copies of data blocks $\{b_{ij}\}_{1 \leq i \leq n, 1 \leq j \leq m_i}$. Alternatively, or in addition, in some example embodiments, the client 110 may delete all the information besides the root hash value R.

In some example embodiments, in response to all of the copies of the data blocks $\{b_{ij}\}_{1 \leq i \leq n, 1 \leq j \leq m_i}$, all of the tags $\{\sigma_i\}_{1 \leq i \leq n}$ and the first file signature $Sig_U$ from the client 110, the storage server 130 may verify 336 whether the tags and the first file signature are valid. For example, the storage server 130 may firstly verify validity of the tags by checking whether the equation $e(\sigma_i,g)=e(H_1(ID_U)^{H(M_i)},pk_U)$·

$$e(\sigma_i, g) = e\left(H_1(ID_U)^{H(M_i)}, pk_U\right) \cdot e\left(u^{\sum_{j=1}^{m_i} b_{ij}}, mpk\right)$$

can be satisfied. In response to the equation being unsatisfied, the storage server 130 may refuse to store the corresponding data blocks and tags. In response to the equation being satisfied, the storage server 130 may compute the route hash value R based on the MHT (such as, the MHT 200 as shown in FIG. 2) and verify validity of the first file signature $Sig_U$ by checking whether the relationship $e(Sig_U, g)=e(H(R),pk_U)$ can be satisfied. In response to the relationship being unsatisfied, the storage server 130 may refuse to store the corresponding data blocks and tags. In response to the relationship being satisfied, the storage server 130 may store 337 all of the data sent from the client 110 and generate 337 a file signature (also referred to as "second file signature") for the file based on the root hash value and the private key of the storage server 130. For example, the second file signature can be generated as: $Sig_C=H(R)^{xc}$. The storage server 130 may send 338 the second file signature $Sig_C$ to the client 110. In response to receiving the second file signature $Sig_C$, the client 110 may check 339 validity of the second file signature $Sig_C$ by comparing $e(Sig_C,g)$ with $e(H(R),pk_C)$. In response to $e(Sig_C,g)$ being equal to $e(H(R),pk_C)$ (that is, the second file signature being valid), the client 110 may determine that the file has been stored correctly by the storage server 130.

Figure 3C:
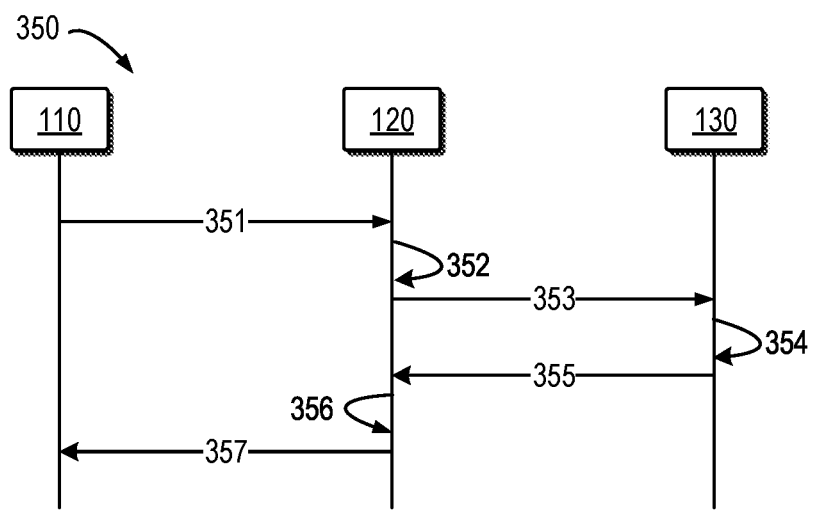
FIG. 3C illustrates an interaction diagram of an example process for verifying data integrity of the file stored at the storage server according to some example embodiments of the present disclosure.

FIG. 3C illustrates an interaction diagram of an example process 350 for verifying data integrity of the file stored at the storage server according to some example embodiments of the present disclosure. The process 350 may involve the client 110, the audit server 120 and the storage server 130 as shown in FIG. 1. In the example as shown in FIG. 3C, the client 110 may delegate the audit of data integrity to the audit server 120. It is to be understood that the process 350 may include additional acts not shown in FIG. 3C, or omit some acts shown in FIG. 3C. The scope of the present disclosure is not limited in this aspect.

As shown in FIG. 3C, the client 110 may send 351, to the audit server 120, a request (that is, the first request) for verifying data integrity of the file stored at the storage server 130. In response to the first request, the audit server 120 may generate 352 a challenge message. In some example embodiments, the audit server 120 may selects a set of data blocks of the file for integrity verification. For example, the audit server 120 may randomly select c data blocks from the total n data blocks of the file, where c represents the number of data blocks to be challenged. For each of the selected data blocks $b_i$ (where $i \in I$ and I represents a randomly selected subset of $\{1, 2 \ldots n\}$), the audit server 120 may determine a verification parameter $\{r_i \in Z_q\}_{i \in I}$. The audit server 120 may generate the challenge message to include verification parameters of the set of data blocks and ail indication of the set of data blocks. Then, the audit server 120 may send 353 the challenge message to the storage server 130.

In response to receiving the challenge message from the audit server 120, the storage server 130 may generate 354 a proof $\{\sigma, \mu, M\}$ based on the challenge message. In some example embodiments, the proof $\{\sigma, \mu, M\}$ may include a tag proof $\sigma$, a data block proof $\mu$ and respective hash values M of the c data blocks. For example, the proof $\{\sigma, \mu, M\}$ can be generated as:

$$\sigma = \prod_{(i,r_i) \in Q} \sigma_i^{r_i} \in G_1, \quad \mu = \sum_{(i,r_i) \in Q} r_i \cdot \left(\sum_{j=1}^{m_i} b_{ij}\right) \in Z_q,$$

and $M_i=H(b_{i1})\| \ldots \|H(b_{ij})\| \ldots \|H(b_{im_i})$, where $i \in I$. Then, the storage server 130 may send 355 the proof to the audit server 120. In response to receiving the proof, the audit server 120 may verify 356 validity of the proof, so as to determine whether the file has been stored correctly at the storage server 130. For example, the audit server 120 may verify the validity of the proof by checking whether the relationship $$e(\sigma, g) = e\left(H_1(ID_U)^{\sum_{i \in Q} r_i \cdot H(M_i)}, pk_U\right) \cdot e\left(\prod_{i \in Q} u^\mu, mpk\right)$$

can be satisfied. In response to the relationship being satisfied, the audit server 120 may determine that the storage server 130 has stored the file correctly as required by the client 110. In response to the relationship being unsatisfied, the audit server 120 may determine a failure in verifying the data integrity of the file. The audit server 120 may send 357, to the client 110, a response to the first request, the response indicating a verification result of the data integrity of the file.

Figure 3D:
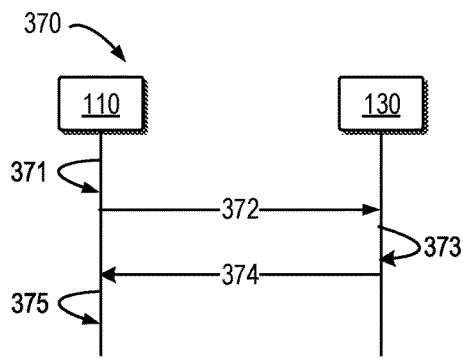
FIG. 3D illustrates an interaction diagram of another example process for verifying data integrity of the file stored at the storage server according to some example embodiments of the present disclosure.

FIG. 3D illustrates an interaction diagram of another example process 370 for verifying data integrity of the file stored at the storage server according to some example embodiments of the present disclosure. The process 370 may involve the client 110 and the storage server 130 as shown in FIG. 1. In the example as shown in FIG. 3D, the client 110 may initiate the audit of data integrity by itself, without delegating it to a third party. It is to be understood that the process 370 may include additional acts not shown in FIG. 3D, or omit some acts shown in FIG. 3D. The scope of the present disclosure is not limited in this aspect.

As shown in FIG. 3D, the client 110 may generate 371 a challenge message. In some example embodiments, the client 110 may selects a set of data blocks of the file for integrity verification. For example, the client 110 may randomly select c data blocks from the total n data blocks of the file, where c represents the number of data blocks to be challenged. For each of the selected data blocks $b_i$ (where $i \in I$ and I represents a randomly selected subset of $\{1, 2 \ldots n\}$), the client 110 may determine a verification parameter $\{r_i \in Z_q\}_{i \in I}$. The client 110 may generate the challenge message which includes verification parameters of the set of data blocks and an indication of the set of data blocks. Then, the client 110 may send 372 the challenge message to the storage server 130.

In response to receiving the challenge message from the client 110, the storage server 130 may generate 373 a proof $\{\sigma, \mu, M\}$ based on the challenge message. In some example embodiments, the proof $\{\sigma, \mu, M\}$ may include a tag proof $\alpha$, a data block proof $\mu$ and respective hash values M of the c data blocks. For example, the proof $\{\sigma, \mu, M\}$ can be generated as:

$$\sigma = \prod_{(i,r_i) \in Q} \sigma_i^{r_i} \in G_1, \quad \mu = \sum_{(i,r_i) \in Q} r_i \cdot \left(\sum_{j=1}^{m_i} b_{ij}\right) \in Z_q,$$

and $M_i=H(b_{i1})\|\ldots\|H(b_{ij})\|\ldots\|H(b_{im_i})$, where $i\in I$. Then, the storage server 130 may send 374 the proof to the client 110. In response to receiving the proof, the client 110 may verify 375 validity of the proof, so as to determine whether the file has been stored correctly at the storage server 130. For example, the client 110 may verify the validity of the proof by checking whether the relationship $$e(\sigma, g) = e\left(H_1(ID_U)^{\sum_{i\in Q} r_i \cdot H(M_i)}, pk_U\right) \cdot e\left(\prod_{i\in Q} u^\mu, mpk\right)$$

can be satisfied. In response to the relationship being satisfied, the client 110 may determine that the storage server 130 has stored the file correctly as required by the client 110. In response to the relationship being unsatisfied, the client 110 may determine a failure in verifying the data integrity of the file.

Figure 3E:
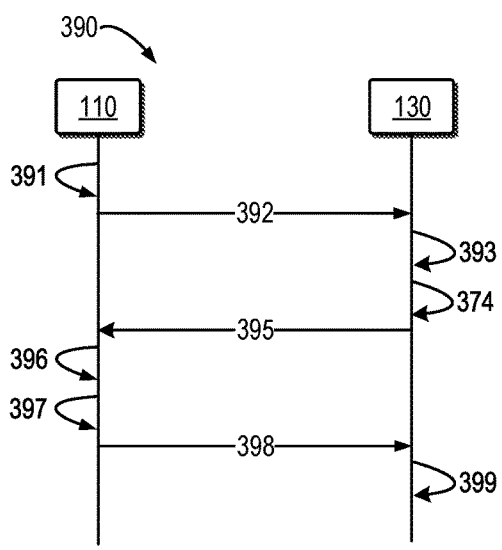
FIG. 3E illustrates an interaction diagram of an example process for updating the file stored at the storage server according to some example embodiments of the present disclosure.

FIG. 3E illustrates an interaction diagram of an example process 390 for updating the file stored at the storage server according to some example embodiments of the present disclosure. For the purpose of discussion, the process 390 will be described with reference to FIG. 1. The process 390 may involve the client 110 and the storage server 130 as shown in FIG. 1. It is to be understood that the process 390 may include additional acts not shown in FIG. 3E, or omit some acts shown in FIG. 3E. The scope of the present disclosure is not limited in this aspect.

As shown in FIG. 3E, the client 110 may generate 391 a request (also referred to as "second request") for updating a data block of the file stored at the storage server 130. In some examples embodiments, three update operations are supported, which include modification of a data block, insertion of a data block and deletion of a block. For example, the second request may be represented as: req={name,OP,i,$b_i^*,\sigma_i^*$}, where name represents the file identification and i represents the serial number of a target data block. OP can be selected from a set {'M', 'I', 'D'}, where 'M' indicates that the data block $b_i$ is to be modified, 'I' indicates that a new data block is to be inserted before the data block $b_i$ and 'D' indicates that the data block $b_i$ is to be deleted. $b_i^*$ and $\sigma_i^*$ represent the new value of a data block and the corresponding tag, and the values of $b_i^*$ and $\sigma_i^*$ may be null when OP is set as 'D'. The client 110 may send 392 the second request to the storage server 130.

In some example embodiments, given the file $F=\{b_i\}_{1\leq i\leq n}$, if the data block $b_i$ is to be modified as a new data block $b_i'$, the client 110 may firstly generate $m_i$ copies for the new data block $b_i'$, that is, $b_{ij}'=b_i'+\Psi_K$ (name$\|j\|v_i$), where $j\in[1, m_i]$. The client 110 may then generate a new tag $\sigma_i'$ for the new data block $b_i'$, that is, $$\sigma_i' = ssk_U^{H(M_i')} \cdot \left(u^{\sum_{j=1}^{m_i} b_{ij}'}\right)^{x_U},$$

where $1\leq i\leq m_i$ and $M_i'=H(b_{i1}')\|\ldots\|H(b_{ij}')\|\ldots\|H(b_{im_i}')$. Then, the client 110 may send 392 a modification request {name, M, i, $\{b_{ij}'\}_{1\leq i\leq m_i}, \sigma_i'$} to the storage server 130. In response to receiving the modification request from the client 110, the storage server 130 may replace 393 copies (represented as $b_{ij}\forall i$) of the original data block $b_i$ with copies ($b_{ij}'\forall i$) of the new data block $b_i'$, and replace the tag $\sigma_i$ of the original data block $b_i$ with the tag $\sigma_i'$ the new data block $b_i'$. Then, the storage server 130 may generate 394 a proof (also referred to as "second proof" in the following) indicating that the copies and the corresponding tag of the original data block have been modified at the storage server 130. For example, the storage server 130 may update the UHT and generate a new root hash value R'. The storage server 130 may generate a signature $Sig_C$ base on the new root hash value R' Finally, the storage server 130 may send 395 the second proof P=$\{\Omega_i,H(M_i),Sig_C,R'\}$ to the client 110, where $\Omega_i$ represents the verification path of $b_i$. In response to receiving the second proof, the client 110 may verify 396 validity of the second proof. For example, the client 110 may get the old root hash value by using $\{\Omega_i,H(M_i)\}$ and compare it with the stored root hash value. If the checking of the root hash value succeeds (that is, the old root hash value determined based on $\{\Omega_i,H(M_i)\}$ is equal to the stored root hash value), the client 110 may further verify validity of R' by checking whether the equation $e(Sig_C,g)=e(H(R'),pk_C)$ can be satisfied. In response to the equation being satisfied, the client 110 may store the new root R' and generate 397 a new signature (also referred to as "third file signature") $Sig_U=H(R')^{x_U}$. The client 110 may send 398 the third file signature to the storage server 130 for storage. The storage server 130 may verify 399 validity of the third file signature $Sig_U$ by checking whether the equation $e(Sig_U,g)=e(H(R'),pk_U)$ can be satisfied. In response to the equation being satisfied, the storage server 130 may determine that the client 110 has acknowledged the modification operation.

Alternatively, in some example embodiments, given the file $F=\{b_i\}_{1\leq i\leq n}$, if a data block $b_i'$ is to be inserted before the data block $b_i$, the client 110 may firstly generate $m_i$ copies for the new data block $b_i'$, that is, $b_{ij}'=b_i'+\Psi_K$ (name$\|j\|v_i$), where $j\in[1, m_i]$. The client 110 may then generate a new tag $\sigma_i'$ for the new data block $b_i'$, $$\sigma_i' = ssk_U^{H(M_i')} \cdot \left(u^{\sum_{j=1}^{m_i} b_{ij}'}\right)^{x_U},$$

where $1\leq i\leq m_i$ and $M_i'=H(b_{i1}')\|\ldots\|H(b_{ij}')\|\ldots\|H(b_{im_i}')$. Then, the client 110 may send 392 a modification request {name, I, i, $\{b_{ij}'\}_{1\leq i\leq m_i}, \sigma_i'$} to the storage server 130. In response to receiving the insertion request from the client 110, the storage server 130 may insert 393 $b_{ij}'\forall i$ before $b_{ij}\forall i$, and insert $\sigma_i'$ before $\sigma_i$. Then, the storage server 130 may generate 394 the second proof indicating that the copies and the corresponding tag of the new data block $b_i'$ are inserted at the storage server 130. For example, the storage server 130 may update the MHT and generate a new root hash value R'. The storage server 130 may generate a signature $Sig_C$ base on the new root hash value R'. Finally, the storage server 130 may send 395 the second proof P=$\{\Omega_i,H(M_i),Sig_C,R'\}$ to the client 110, where $\Omega_i$ represents the verification path of $b_i$. In response to receiving the second proof, the client 110 may verify 396 validity of the second proof. For example, the client 110 may get the old root hash value by using $\{\Omega_i,H(M_i)\}$ and compare it with the stored root hash value. If the checking of the root hash value succeeds (that is, the old root hash value determined based on $\{\Omega_i,H(M_i)\}$ is equal to the stored root hash value), the client 110 may further verify validity of R' by checking whether the equation $e(Sig_C,g)=e(H(R'),pk_C)$ can be satisfied. In response to the equation being satisfied, the client 110 may store the new root R' and generate 397 the third file signature $Sig_U=H(R')^{x_U}$. The client 110 may send 398 the third file signature to the storage server 130 for storage. The storage server 130 may verify 399 validity of the third file signature Sig by checking whether the equation $e(SIG_U,g)=e(H(R'),pk_U)$ can be satisfied. In response to the equation being satisfied, the storage server 130 may determine that the client 110 has acknowledged the insertion operation.

In some example embodiments, given the file $F=\{b_i\}_{1\leq i\leq n}$, if a data block h to be deleted from the file, the client 110 may send 392 a deletion request {name, D, i, null, null} to the storage server 130. In response to receiving the deletion request from the client 110, the storage server 130 may delete 393 the copies $b_{ij}\forall i$ of the data block and the tag $a_i$ of the data block. Then, the storage server 130 may generate 394 the second proof indicating that the copies and the corresponding tag of the data block $b_i$ are deleted at the storage server 130. For example, the storage server 130 may update the MHT and generate a new root hash value R'. The storage server 130 may generate a signature $Sig_C$ base on the new root hash value R' Finally, the storage server 130 may send 395 the second proof $P=\{\Omega_i,H(M_i),Sig_C,R'\}$ to the client 110, where $\Omega_i$ represents the verification path of $b_i$ in the old tree. In response to receiving the second proof, client 110 may verify 396 validity of the second proof. For example, the client 110 may get the old root hash value by using $\{\Omega_i,H(M_i)\}$ and compare it with the stored root hash value. If the checking of the root hash value succeeds (that is, the old root hash value determined based on $\{\Omega_i,H(M_i)\}$ is equal to the stored root hash value), the client 110 may further verify validity of R' by checking whether the equation $e(Sig_C,g)=e(H(R'),pk_C)$ can be satisfied. In response to the equation being satisfied, the client 110 may store the new root R' and generate 397 the third file signature $Sig_U=H(R')^{x_U}$. The client 110 may send 398 the third file signature to the storage server 130 for storage. The storage server 130 may verify 399 validity of the third file signature $Sig_U$ by checking whether the equation $e(Sig_U,g)=e(H(R'),pk_U)$ can be satisfied. In response to the equation being satisfied, the storage server 130 may determine that the client 110 has acknowledged the deletion operation.

In some example embodiments, if any verification of validity of a file signature or a proof fails or a conflict between the client 110 and the storage server 130 occurs, arbitration may be initiated. The root hash value R stored at the client 110, and the file signature $Sig_C$ that is generated based on the root hash value R and stored at the storage server 130 may be provided to an arbitration entity which is trusted by both the client 110 and the storage server 130. The arbitration entity may verify validity of $Sig_C$ by checking whether $e(Sig_C,g)=e(H(R),pk_C)$ can be satisfied. If the equation is satisfied, the arbitration entity may output a result indicating that the client 110 is dishonest. If the equation is unsatisfied, the arbitration entity may output a different result indicating that the storage server 130 is dishonest.

In view of the above, it can be seen that embodiments of the present disclosure propose a multi-copy public auditing scheme using certificateless signature. This scheme allows a user to determine the number of copies for each data block according to importance of the data block. An improved MHT is proposed to achieve batch updates of multiple copies of a data block, such that the overhead does not increase with the number of copies of the data block. Based on the improved MHT, a signature verification mechanism is enabled to deal with disputes that dishonest users may falsely frame cloud servers for compensation. As such, the scheme according to embodiments of the present disclosure improves the efficiency of dynamic updates for multi-copy storage and thus can be well applied in practice.

Figure 4:
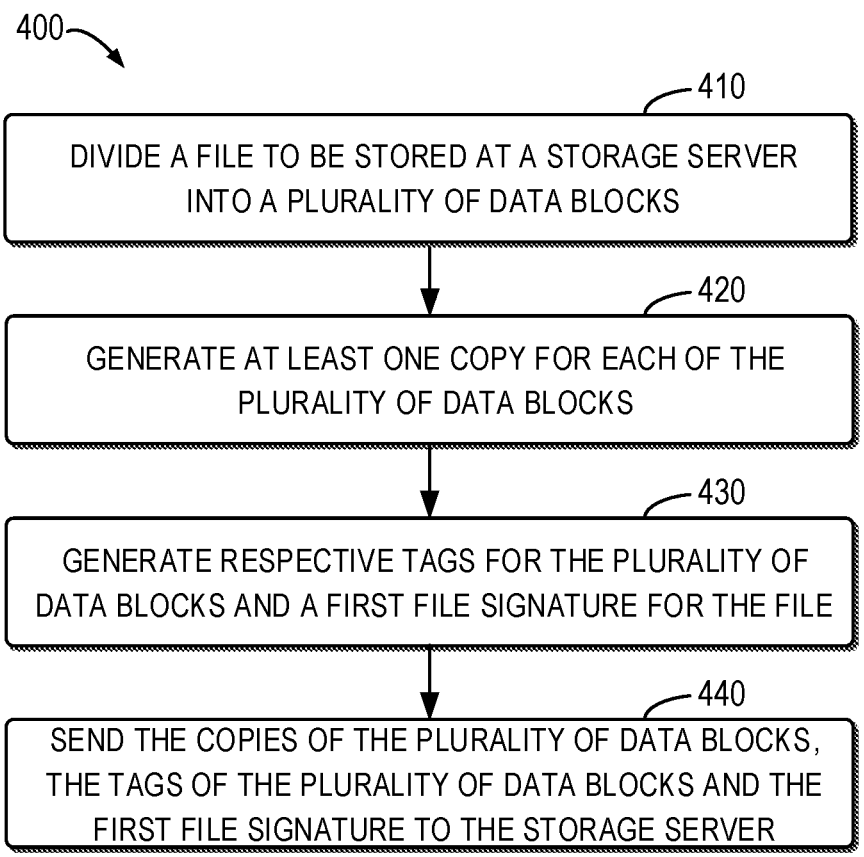
FIG. 4 shows a flowchart of an example method for storing a file into a storage server according to some example embodiments of the present disclosure.

FIG. 4 shows a flowchart of an example method 400 for storing a file into a storage server according to some example embodiments of the present disclosure. The method 400 can be implemented at the client 110 as shown in FIG. 1. It is to be understood that the method 400 may include additional blocks not shown and/or may omit some shown blocks, and the scope of the present disclosure is not limited in this regard.

At block 410, the client 110 divides a file to be stored at the storage server 130 into a plurality of data blocks.

At block 420, the client 110 generates, for each of the plurality of data blocks, at least one copy, the number of which is associated with importance of the data block.

At block 430, the client 110 generates, based on copies of the plurality of data blocks and a first private key of the client 110 obtained from the KGC 140, respective tags for the plurality of data blocks and a first file signature for the file.

At block 440, the client 110 sends the copies of the plurality of data blocks, the tags of the plurality of data blocks and the first file signature to the storage server 130 for storing the file at the storage server 130.

In some example embodiments, the method 400 further comprises: sending, to the audit server 120, a first request for verifying data integrity of the file stored at the storage server 130; and receiving, from the audit server 120, a response to the first request, the response indicating a verification result of the data integrity of the file.

In some example embodiments, the method 400 further comprises: sending, to the KGC 140, an identifier of the client 110; receiving, from the KGC 140, a partial private key generated based on the identifier; verifying validity of the partial private key; and in response to the partial private key being valid, determining the first private key based on the partial private key and a secret value of the client 110.

In some example embodiments, the generating respective tags for the plurality of data blocks and a first file signature for the file comprises: determining a hash value for each of the plurality of data blocks; generating the tags for the plurality of data blocks based on hash values of the plurality of data blocks, the copies of the plurality of data blocks and the first private key; and generating the first file signature based on the hash values of the plurality of data blocks and the first private key.

In some example embodiments, the plurality of data blocks comprise a first data block having a first set of copies, and the determining a hash value for each of the plurality of data blocks comprises: generating a hash value for each of the first set of copies; aggregating hash values of the first set of copies; and generating, based on a result of the aggregation, a hash value for the first data block.

In some example embodiments, the method 400 further comprises: receiving a second file signature of the file from the storage server 130, the second file signature being generated based on a second private key of the storage server 130; verifying validity of the second file signature based on a public key of the storage server 130; and in response to the second file signature being valid, determining that the file has been stored at the storage server 130.

In some example embodiments, the method 400 further comprises: sending, to the storage server 130, a second request for updating the file stored at the storage server 130; receiving, from the storage server 130, a proof indicating that the file stored at the storage server 130 is updated based on the second request; verifying validity of the proof based on the first file signature; in response to the proof being valid, generating a third file signature based on the proof and the first private key; and sending, to the storage server 130, the third file signature to indicate that the updating has been acknowledged by the client 110.

In some example embodiments, the plurality of data blocks comprise a second data block having a second set of copies and a second tag. The sending a second request comprises sending, to the storage server 130, the second request for modifying the second data block as a third data block, the second request indicating a third number of copies and a third tag generated for the third data block. The receiving a proof comprises receiving, from the storage server 130, the proof indicating that the second set of copies are replaced by the third set of copies and the second tag is replaced by the third tag.

In some example embodiments, the plurality of data blocks comprise a second data block having a second set of copies and a second tag. The sending a second request comprises sending, to the storage server 130, the second request for inserting a third data block before the second data block, the second request indicating a third number of copies and a third tag generated for the third data block. The receiving a proof comprises receiving, from the storage server 130, the proof indicating that the third set of copies are inserted before the second set of copies and the third tag is inserted before the second tag.

In some example embodiments, the plurality of data blocks comprise a second data block having a second set of copies and a second tag. The sending a second request comprises sending, to the storage server 130, the second request for deleting the second data block. The receiving a proof comprises receiving, from the storage server 130, the proof indicating that the second set of copies and the tag of the second data block are deleted.

Figure 5:
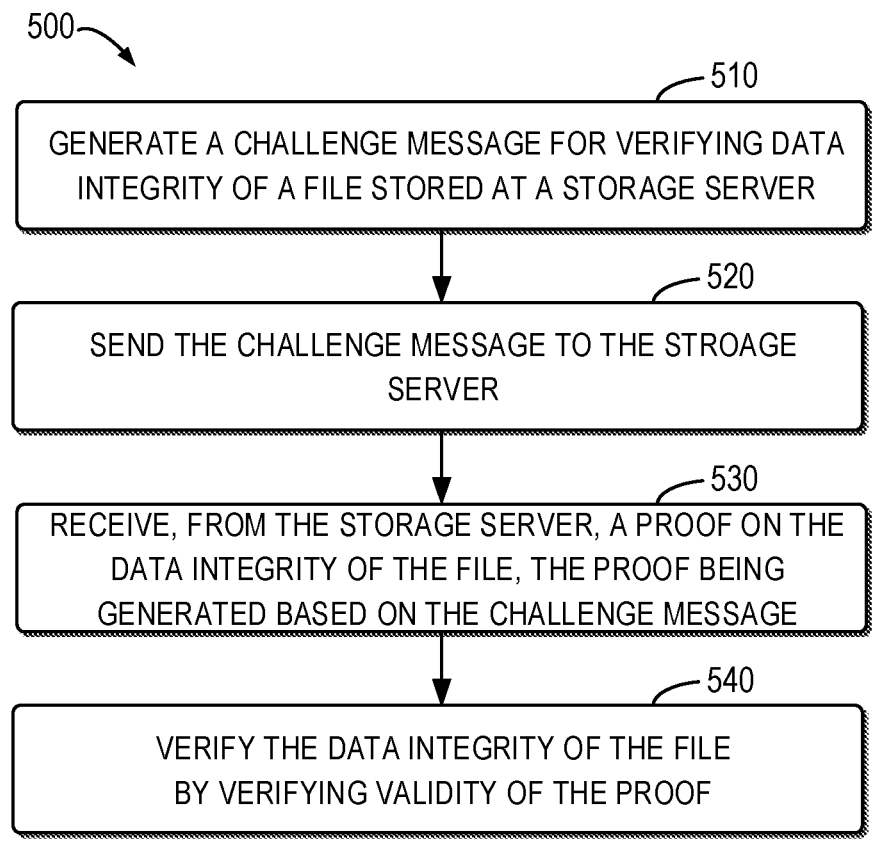
FIG. 5 shows a flowchart of an example method for verifying data integrity of a file stored at a storage server according to some example embodiments of the present disclosure.

FIG. 5 shows a flowchart of an example method for verifying data integrity of a file stored at a storage server according to some example embodiments of the present disclosure. The method 500 can be implemented at the client 110 or the audit server 120 as shown in FIG. 1. It is to be understood that the method 500 may include additional blocks not shown and/or may omit some shown blocks, and the scope of the present disclosure is not limited in this regard.

At block 510, a challenge message for verifying data integrity of a file stored by the client 110 at the storage server 130 is generated. The file stored at the storage server 130 comprises a plurality of data blocks, each data block comprises a tag and at least one copy, and the number of the at least one copy is associated with importance of the data block.

In some example embodiments, the generating a challenge message comprises: selecting, from the plurality of data blocks, a set of data blocks for verifying the data integrity of the file; determining a verification parameter for each of the set of data blocks; and generating the challenge message comprising verification parameters of the set of data blocks and an indication of the set of data blocks.

At block 520, the challenge message is sent to the storage server 130.

At block 530, a proof on the data integrity of the file is received from the storage server 130. The proof is generated based on the challenge message.

In some example embodiments, the proof on the data integrity of the file comprises: a tag proof generated based on the tags of the set of data blocks; a data block proof generated based on respective copies of the set of data blocks and the verification parameters of the set of data blocks; and respective hash values of the set of data blocks.

At block 540, the data integrity of the file stored at the storage server 130 is verified by verifying validity of the proof.

In some example embodiments, the verifying the data integrity of the file comprises: determining whether the tag proof, the data block proof and the hash values of the set of data blocks satisfy a predetermined relationship; in response to the predetermined relationship being satisfied, determining that the proof is valid; and in response to the proof being valid, determining a success in verifying the data integrity of the file.

In some example embodiments, the verifying the data integrity of the file further comprises: in response to the predetermined relationship being unsatisfied, determining that the proof is invalid; and in response to the proof being invalid, determining a failure in verifying the data integrity of the file.

In some example embodiments, the method 500 is performed at the client 110.

In some example embodiments, the method 500 is performed at the audit server 120 separate from the client 110. The generating the challenge message comprises in response to receiving from the client 110 a first request for verifying the data integrity of the file stored at the storage server 130, generating the challenge message. The method 500 further comprises in response to the data integrity of the file being verified, sending, to the client 110, a response to the first request, the response indicating a verification result of the data integrity of the file.

Figure 6:
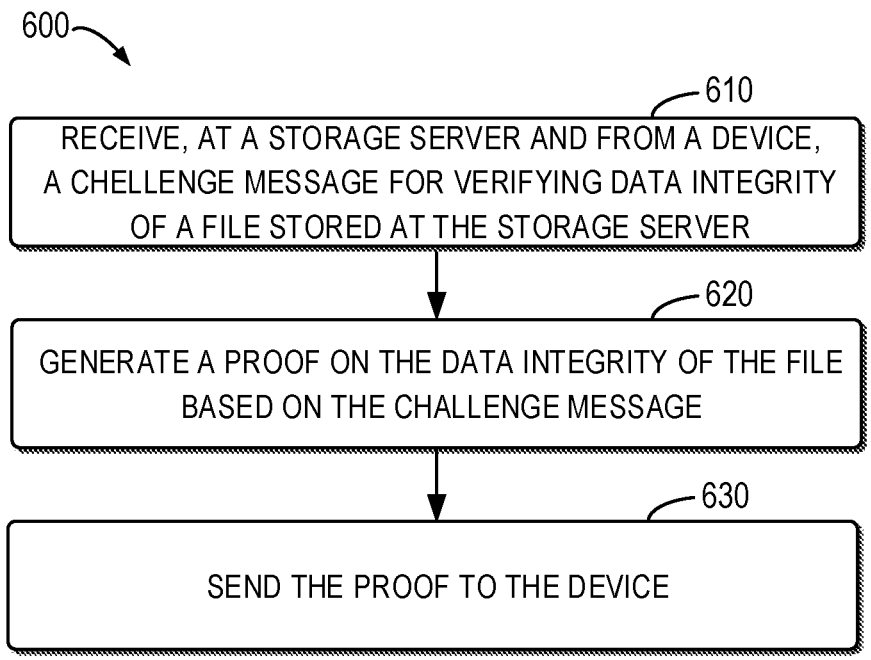
FIG. 6 shows a flowchart of an example method for verifying data integrity of a file stored at a storage server according to some example embodiments of the present disclosure.

FIG. 6 shows a flowchart of an example method for verifying data integrity of a file stored at a storage server according to some example embodiments of the present disclosure. The method 600 can be implemented at the storage server 130 as shown in FIG. 1. It is to be understood that the method 600 may include additional blocks not shown and/or may omit some shown blocks, and the scope of the present disclosure is not limited in this regard.

At block 610, the storage server 130 receives, from a device, a challenge message for verifying data integrity of a file stored by the client 110 at the storage server 130. The file comprises a plurality of data blocks, each data block comprises a tag and at least one copy, and the number of the at least one copy is associated with importance of the data block.

In some example embodiments, the device comprises the client 110.

In some example embodiments, the device comprises the audit server 120 separate from the client 110.

At block 620, the storage server 130 generates, based on the challenge message, a first proof on the data integrity of the file.

At block 630, the storage server 130 sends the first proof to the device.

In some example embodiments, the method 600 further comprises: prior to receiving the challenge message, receiving, from the client 110, respective copies of the plurality of data blocks, respective tags of the plurality of data blocks and a first file signature of the file, the tags of the plurality of data blocks and the first file signature generated based on the copies of the plurality of data blocks and a first private key of the client 110; verify validity of the tags of the plurality of data blocks and the first file signature; and in response the tags of the plurality of data blocks and the first file signature being valid, store the file at the storage server 130 by storing the copies of the plurality of data blocks, the tags of the plurality of data blocks and the first file signature.

In some example embodiments, the method 600 further comprises: determining a hash value for each of the plurality of data blocks; in response to the file being stored at the storage server 130, generating a second file signature for the file based on hash values of the plurality of data blocks and a second private key of the storage server 130 obtained from the KGC 140; and sending the second file signature to the client 110.

In some example embodiments, the method 600 further comprises: sending, to the KGC 140, an identifier of the storage server 130; receiving, from the KGC 140, a partial private key generated based on the identifier; verifying validity of the partial private key; and in response to the partial private key being valid, determining the second private key based on the partial private key and a secret value of the storage server 130.

In some example embodiments, the determining a hash value for each of the plurality of data blocks comprises: generating a hash value for each of the first set of copies; aggregating hash values of the first set of copies; and generating, based on a result of the aggregation, a hash value for the first data block.

In some example embodiments, the generating a first proof comprises: generating a tag proof based on respective tags of the set of data blocks; generating a data block proof based on respective copies of the set of data blocks and the verification parameters of the set of data blocks; generating a hash value for each of the set of data blocks; and generating the first proof comprising the tag proof, the data block proof and hash values of the set of data blocks. The sending the first proof comprises sending, to the device, the first proof comprising the tag proof, the data block proof and hash values of the set of data blocks.

In some example embodiments, the method 600 further comprises: receiving, from the client 110, a second request for updating the file stored at the storage server 130; in response to the second request, updating the file; generating a second proof indicating that the file stored at the storage server 130 is updated; sending the second proof to the client 110; receiving, from the client 110, a third file signature generated based on the second proof and the first private key; verifying validity of the third file signature based on a public key of the client 110; and in response to the third file signature being valid, determining that the client 110 has acknowledged the updating.

In some example embodiments, the plurality of data blocks comprise a second data block having a second set of copies and a second tag. The receiving a second request comprises receiving, from the client 110, the second request for modifying the second data block as a third data block, the second request indicating a third number of copies and a third tag generated for the third data block. The updating the file comprises replacing the second set of copies with the third set of copies and replacing the second tag with the third tag. The generating a second proof comprises generating the second proof indicating that the second set of copies are replaced by the third set of copies and the second tag is replaced by the third tag.

In some example embodiments, the plurality of data blocks comprise a second data block having a second set of copies and a second tag. The receiving a second request comprises receiving, from the client 110, the second request for inserting a third data block before the second data block, the second request indicating a third number of copies and a third tag generated for the third data block. The updating the file comprises inserting the third set of copies before the second set of copies and inserting the third tag before the second tag. The generating a second proof comprises generating the second proof indicating that the third set of copies are inserted before the second set of copies and the third tag is inserted before the second tag.

In some example embodiments, the plurality of data blocks comprise a second data block having a second set of copies and a second tag. The receiving a second request comprises receiving, from the client 110, the second request for deleting the second data block. The updating the file comprises deleting the second set of copies and the second tag. The generating a second proof comprises generating the second proof indicating that the second set of copies and the tag of the second data block are deleted.

In some example embodiments, an apparatus capable of performing the method 400 may comprise means for performing the respective steps of the method 400. The means may be implemented in any suitable form. For example, the means may be implemented in a circuitry or software module.

In some example embodiments, the apparatus capable of performing the method 400 (for example, the client 110) comprises: means for dividing a file to be stored at a storage server into a plurality of data blocks; means for generating at least one copy for each of the plurality of data blocks, the number of the at least one copy being associated with importance of the data block; means for generating, based on copies of the plurality of data blocks and a first private key of the apparatus obtained from a key generation center, respective tags for the plurality of data blocks and a first file signature for the file; and means for sending the copies of the plurality of data blocks, the tags of the plurality of data blocks and the first file signature to the storage server for storing the file at the storage server.

In some example embodiments, the apparatus capable of performing the method 400 further comprises: means for sending, to an audit server, a first request for verifying data integrity of the file stored at the storage server; and means for receive, from the audit server, a response to the first request, the response indicating a verification result of the data integrity of the file.

In some example embodiments, the apparatus capable of performing the method 400 further comprises: means for sending, to the key generation center, an identifier of the apparatus; means for receiving, from the key generation center, a partial private key generated based on the identifier; means for verifying validity of the partial private key; and means for in response to the partial private key being valid, determining the first private key based on the partial private key and a secret value of the apparatus.

In some example embodiments, the means for generating respective tags for the plurality of data blocks and a first file signature for the file comprises: means for determining a hash value for each of the plurality of data blocks; means for generating the tags for the plurality of data blocks based on hash values of the plurality of data blocks, the copies of the plurality of data blocks and the first private key; and means for generating the first file signature based on the hash values of the plurality of data blocks and the first private key.

In some example embodiments, the plurality of data blocks comprise a first data block having a first set of copies and the means for determining a hash value for each of the plurality of data blocks comprises: means for generating a hash value for each of the first set of copies; means for aggregating hash values of the first set of copies; and means for generating, based on a result of the aggregation, a hash value for the first data block.

In some example embodiments, the apparatus capable of performing the method 400 further comprises: means for receiving a second file signature of the file from the storage server, the second file signature being generated based on a second private key of the storage server; means for verifying validity of the second file signature based on a public key of the storage server; and means for in response to the second file signature being valid, determining that the file has been stored at the storage server.

In some example embodiments, the apparatus capable of performing the method 400 further comprises: means for sending, to the storage server, a second request for updating the file stored at the storage server; means for receiving, from the storage server, a proof indicating that the file stored at the storage server is updated based on the second request; means for verifying validity of the proof based on the first file signature; means for in response to the proof being valid, generating a third file signature based on the proof and the first private key; and means for sending, to the storage server, the third file signature to indicate that the updating has been acknowledged by the apparatus.

In some example embodiments, the plurality of data blocks comprise a second data block having a second set of copies and a second tag. The means for sending a second request comprises means for sending, to the storage server, the second request for modifying the second data block as a third data block, the second request indicating a third number of copies and a third tag generated for the third data block. The means for receiving a proof comprises means for receiving, from the storage server, the proof indicating that the second set of copies are replaced by the third set of copies and the second tag is replaced by the third tag.

In some example embodiments, the plurality of data blocks comprise a second data block having a second set of copies and a second tag. The means for sending a second request comprises means for sending, to the storage server, the second request for inserting a third data block before the second data block, the second request indicating a third number of copies and a third tag generated for the third data block. The means for receiving a proof comprises means for receiving, from the storage server, the proof indicating that the third set of copies are inserted before the second set of copies and the third tag is inserted before the second tag.

In some example embodiments, the plurality of data blocks comprise a second data block having a second set of copies and a second tag. The means for sending a second request comprises means for sending, to the storage server, the second request for deleting the second data block. The means for receiving a proof comprises means for receiving, from the storage server, the proof indicating that the second set of copies and the tag of the second data block are deleted.

In some example embodiments, an apparatus capable of performing the method 500 may comprise means for performing the respective steps of the method 500. The means may be implemented in any suitable form. For example, the means may be implemented in a circuitry or software module.

In some example embodiments, the apparatus capable of performing the method 500 (for example, the client 110 or the audit server 120) comprises: means for generating a challenge message for verifying data integrity of a file stored at a storage server by a client, the file comprising a plurality of data blocks, each data block comprising at least one copy and having a tag generated based on the at least one copy, and the number of the at least one copy being associated with importance of the data block; means for sending the challenge message to the storage server; means for receiving, from the storage server, a proof on the data integrity of the file, the proof being generated based on the challenge message; and means for verifying the data integrity of the file by verifying validity of the proof.

In some example embodiments, the means for generating a challenge message comprises: means for selecting, from the plurality of data blocks, a set of data blocks for verifying the data integrity of the file; means for determining a verification parameter for each of the set of data blocks; and means for generating the challenge message comprising verification parameters of the set of data blocks and an indication of the set of data blocks.

In some example embodiments, the proof on the data integrity of the file comprises: a tag proof generated based on the tags of the set of data blocks; a data block proof generated based on respective copies of the set of data blocks and the verification parameters of the set of data blocks; and respective hash values of the set of data blocks.

In some example embodiments, the means for verifying the data integrity of the file comprises: means for determining whether the tag proof, the data block proof and the hash values of the set of data blocks satisfy a predetermined relationship; means for in response to the predetermined relationship being satisfied, determining that the proof is valid; and means for in response to the proof being valid, determining a success in verifying the data integrity of the file.

In some example embodiments, the means for verifying the data integrity of the file further comprises: means for in response to the predetermined relationship being unsatisfied, determining that the proof is invalid; and means for in response to the proof being invalid, determining a failure in verifying the data integrity of the file.

In some example embodiments, the apparatus comprises the client.

In some example embodiments, the apparatus comprises an audit server separate from the client and the means for generating a challenge message comprises means for in response to receiving from the client a first request for verifying the data integrity of the file stored at the storage server, generating the challenge message. The apparatus further comprises means for in response to the data integrity of the file being verified, sending, to the client, a response to the first request, the response indicating a verification result of the data integrity of the file.

In some example embodiments, an apparatus capable of performing the method 600 may comprise means for performing the respective steps of the method 600. The means may be implemented in any suitable form. For example, the means may be implemented in a circuitry or software module.

In some example embodiments, the apparatus capable of performing the method 600 (for example, the storage server 130) comprises: means for receiving, from a further apparatus, a challenge message for verifying data integrity of a file stored at the apparatus by a client, the file comprising a plurality of data blocks, each data block comprising at least one copy and having a tag generated based on the at least one copy, and the number of the at least one copy being associated with importance of the data block; means for generating, based on the challenge message, a first proof on the data integrity of the file; and means for sending the first proof to the further apparatus.

In some example embodiments, the apparatus capable of performing the method 600 further comprises: mean for prior to receiving the challenge message, receiving, from the client, respective copies of the plurality of data blocks, respective tags of the plurality of data blocks and a first file signature of the file, the tags of the plurality of data blocks and the first file signature generated based on the copies of the plurality of data blocks and a first private key of the client; means for verifying validity of the tags of the plurality of data blocks and the first file signature; and means for in response the tags of the plurality of data blocks and the first file signature being valid, storing the file at the apparatus by storing the copies of the plurality of data blocks, the tags of the plurality of data blocks and the first file signature.

In some example embodiments, the apparatus capable of performing the method 600 further comprises: means for determining a hash value for each of the plurality of data blocks; means for in response to the file being stored at the apparatus, generating a second file signature for the file based on hash values of the plurality of data blocks and a second private key of the apparatus obtained from a key generation center; and means for sending the second file signature to the client.

In some example embodiments, the apparatus capable of performing the method 600 further comprises: means for sending, to the key generation center, an identifier of the apparatus; means for receiving, from the key generation center, a partial private key generated based on the identifier; means for verifying validity of the partial private key; and means for in response to the partial private key being valid, determining the second private key based on the partial private key and a secret value of the apparatus.

In some example embodiments, the plurality of data blocks comprise a first data block having a first set of copies, and the means for determining a hash value for each of the plurality of data blocks comprises: means for generating a hash value for each of the first set of copies; means for aggregating hash values of the first set of copies; and means for generating, based on a result of the aggregation, a hash value for the first data block.

In some example embodiments, the means for generating a first proof comprises: means for generating a tag proof based on respective tags of the set of data blocks; means for generating a data block proof based on respective copies of the set of data blocks and the verification parameters of the set of data blocks; means for generating a hash value for each of the set of data blocks; and means for generating the first proof comprising the tag proof, the data block proof and hash values of the set of data blocks. The means for sending the first proof comprises: means for sending, to the further apparatus, the first proof comprising the tag proof, the data block proof and hash values of the set of data blocks.

In some example embodiments, the apparatus capable of performing the method 600 further comprises: means for receiving, from the client, a second request for updating the file stored at the apparatus; means for in response to the second request, updating the file; means for generating a second proof indicating that the file stored at the apparatus is updated; means for sending the second proof to the client; means for receiving, from the client, a third file signature generated based on the second proof and the first private key; means for verifying validity of the third file signature based on a public key of the client; and means for in response to the third file signature being valid, determining that the client has acknowledged the updating.

In some example embodiments, the plurality of data blocks comprise a second data block having a second set of copies and a second tag. The means for receiving a send request comprises means for receiving, from the client, the second request for modifying the second data block as a third data block, the second request indicating a third number of copies and a third tag generated for the third data block. The means for updating the file comprises means for replacing the second set of copies with the third set of copies and replacing the second tag with the third tag. The means for generating a second proof comprises means for generating the second proof indicating that the second set of copies are replaced by the third set of copies and the second tag is replaced by the third tag.

In some example embodiments, the plurality of data blocks comprise a second data block having a second set of copies and a second tag. The means for receiving a send request comprises means for receiving, from the client, the second request for inserting a third data block before the second data block, the second request indicating a third number of copies and a third tag generated for the third data block. The means for updating the file comprises means for inserting the third set of copies before the second set of copies and inserting the third tag before the second tag. The means for generating a second proof comprises means for generating the second proof indicating that the third set of copies are inserted before the second set of copies and the third tag is inserted before the second tag.

In some example embodiments, the plurality of data blocks comprise a second data block having a second set of copies and a second tag. The means for receiving a send request comprises means for receiving, from the client, the second request for deleting the second data block. The means for updating the file comprises means for deleting the second set of copies and the second tag. The means for generating a second proof comprises means for generating the second proof indicating that the second set of copies and the tag of the second data block are deleted.

In some example embodiments, the further apparatus comprises the client.

In some example embodiments, the further apparatus comprises an audit server separate from the client.

Figure 7:
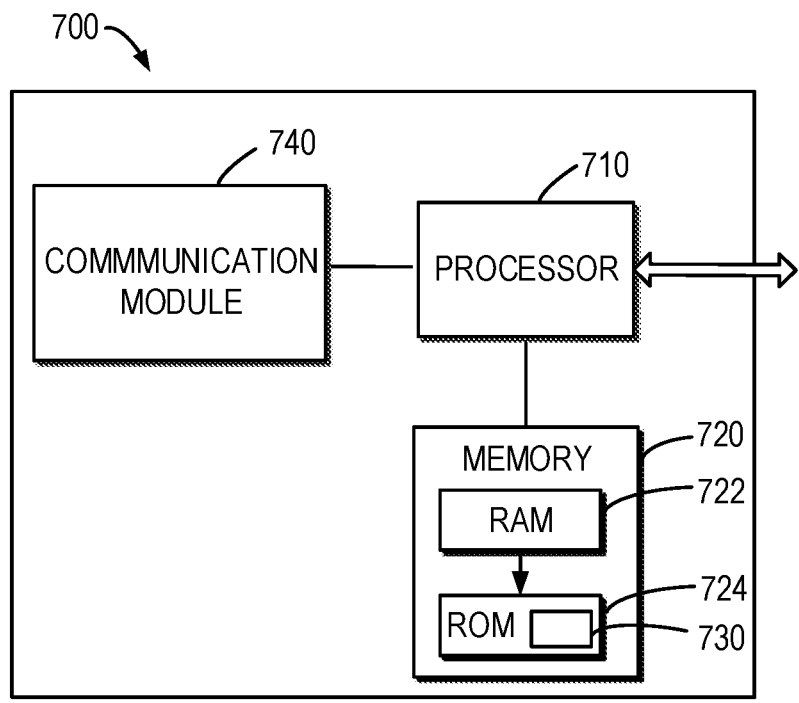
FIG. 7 illustrates a simplified block diagram of an apparatus that is suitable for implementing embodiments of the present disclosure.
Figure 8:
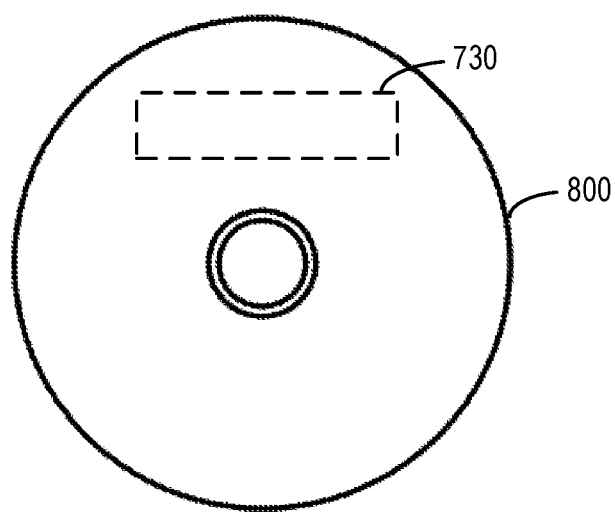
FIG. 8 illustrates a block diagram of an example computer readable medium in accordance with some example embodiments of the present disclosure.

FIG. 7 is a simplified block diagram of a device 700 that is suitable for implementing embodiments of the present disclosure. For example, the client 110, the audit server 120, the storage server 130 and/or the key generation center 140 as shown in FIG. 1 can be implemented by the device 700. As shown, the device 700 includes one or more processors 710, one or more memories 720 coupled to the processor 710, and one or more communication modules 740 coupled to the processor 710.

The communication module 740 is for bidirectional communications. The communication module 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 724. The processor 710 may perform any suitable actions and processing by loading the program 730 into the RAM 722.

The embodiments of the present disclosure may be implemented by means of the program 730 so that the device 700 may perform any process of the disclosure as discussed with reference to FIGS. 4-6. The embodiments of the present disclosure may also be implemented by hardware or by a combination of software and hardware.

In some example embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 10 shows an example of the computer readable medium 800 in form of CD or DVD. The computer readable medium has the program 730 stored thereon.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the apparatus 700 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the distributed unit may be stand-alone apparatuses communicating with each other via a radio path or via a wired connection. Alternatively, they may be in a same entity communicating via a wired connection, etc. The edge cloud or edge cloud server may serve a plurality of distributed units or a radio access networks. In an embodiment, at least some of the described processes may be performed by the central unit. In another embodiment, the apparatus 700 may be instead comprised in the distributed unit, and at least some of the described processes may be performed by the distributed unit.

In an embodiment, the execution of at least some of the functionalities of the apparatus 700 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the apparatus 700 controls the execution of the processes, regardless of the location of the apparatus and regardless of where the processes/functions are carried out.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 400 as described above with reference to FIG. 4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus of a user device, the apparatus comprising:
   at least one processor; and
   at least one non-transitory memory including computer program codes;
   the at least one non-transitory memory and the computer program codes are configured to, with the at least one processor, cause the apparatus to:
      divide, by the user device based on a user instruction, a file to be stored at a storage server into a plurality of data blocks;
      generate, by the user device, at least one copy for each of the plurality of data blocks, wherein a number of the at least one copy is based on a maximum number of copies supported for a respective data block of the plurality of data blocks, the maximum number of copies determined based on an importance of the respective data block;
      generate, by the user device, respective tags for the plurality of data blocks and a first file signature for the file based on copies of the plurality of data blocks and a first private key of the apparatus obtained from a key generation center; and
      send, by the user device, the copies of the plurality of data blocks, the respective tags for the plurality of data blocks and the first file signature to the storage server for storing the file at the storage server.

2. The apparatus of claim 1, wherein the at least one memory and the computer program codes are further configured to, with the at least one processor, cause the apparatus to:
   send, to an audit server, a first request for verifying data integrity of the file stored at the storage server; and
   receive, from the audit server, a response to the first request, the response indicating a verification result of the data integrity of the file.

3. The apparatus of claim 1, wherein the at least one memory and the computer program codes are further configured to, with the at least one processor, cause the apparatus to:
   send, to the key generation center, an identifier of the apparatus;
   receive, from the key generation center, a partial private key generated based on the identifier;
   verify validity of the partial private key; and
   in response to the partial private key being valid, determine the first private key based on the partial private key and a secret value of the apparatus.

4. The apparatus of claim 1, wherein the at least one memory and the computer program codes are configured to, with the at least one processor, cause the apparatus to:
   determine hash values for respective ones of the plurality of data blocks;
   generate the respective tags for the plurality of data blocks based on the hash values, the copies of the plurality of data blocks and the first private key; and
   generate the first file signature based on the hash values of the plurality of data blocks and the first private key.

5. The apparatus of claim 4, wherein the plurality of data blocks comprise a first data block having a first set of copies, and wherein the at least one memory and the computer program codes are configured to, with the at least one processor, cause the apparatus to:
   generate hash values for respective ones of the first set of copies;
   aggregate the hash values for respective ones of the first set of copies; and
   generate, based on a result of the aggregation, a hash value for the first data block.

6. The apparatus of claim 1, wherein the at least one memory and the computer program codes are further configured to, with the at least one processor, cause the apparatus to:
   receive a second file signature of the file from the storage server, the second file signature being generated based on a second private key of the storage server;
   verify validity of the second file signature based on a public key of the storage server; and
   in response to the second file signature being valid, determine that the file has been stored at the storage server.

7. The apparatus of claim 1, wherein the at least one memory and the computer program codes are configured to, with the at least one processor, cause the apparatus to:
   send, to the storage server, a second request for updating the file stored at the storage server;

receive, from the storage server, a proof indicating that the file stored at the storage server is updated based on the second request;
verify validity of the proof based on the first file signature;
in response to the proof being valid, generate a third file signature based on the proof and the first private key; and
send, to the storage server, the third file signature to indicate that the updating has been acknowledged by the apparatus.

8. The apparatus of claim 7, wherein the plurality of data blocks comprise a second data block having a second set of copies and a second tag, and wherein the at least one memory and the computer program codes are configured to, with the at least one processor, cause the apparatus to:
send, to the storage server, the second request for modifying the second data block as a third data block, the second request indicating a third number of copies and a third tag generated for the third data block; and
receive, from the storage server, the proof indicating that the second set of copies are replaced by a third set of copies and the second tag is replaced by the third tag.

9. The apparatus of claim 7, wherein the plurality of data blocks comprise a second data block having a second set of copies and a second tag, and wherein the at least one memory and the computer program codes are configured to, with the at least one processor, cause the apparatus to:
send, to the storage server, the second request for inserting a third data block before the second data block, the second request indicating a third number of copies and a third tag generated for the third data block; and
receive, from the storage server, the proof indicating that a third set of copies are inserted before the second set of copies and the third tag is inserted before the second tag.

10. The apparatus of claim 7, wherein the plurality of data blocks comprise a second data block having a second set of copies and a second tag, and wherein the at least one memory and the computer program codes are configured to, with the at least one processor, cause the apparatus to:
send, to the storage server, the second request for deleting the second data block; and
receive, from the storage server, the proof indicating that the second set of copies and the tag of the second data block are deleted.

11. The apparatus of claim 1, wherein the user device comprises a computer, a mobile phone, a wearable device, or a home appliance.

12. An apparatus of an audit server, the apparatus comprising:
at least one processor; and
at least one non-transitory memory including computer program codes;
the at least one non-transitory memory and the computer program codes are configured to, with the at least one processor, cause the apparatus to:
generate, by the audit server, a challenge message for verifying data integrity of a file stored at a storage server by a user device, the file comprising a plurality of data blocks, each data block comprising at least one copy and having a tag generated based on the at least one copy, and a number of the at least one copy is based on a maximum number of copies supported for a respective data block of the plurality of data blocks, the maximum number of copies determined based on an importance of the respective data block;
send, by the audit server, the challenge message to the storage server;
receive, by the audit server, from the storage server, a proof on the data integrity of the file, the proof being generated based on the challenge message; and
verify, by the audit server, the data integrity of the file by verifying validity of the proof.

13. The apparatus of claim 12, wherein the at least one memory and the computer program codes are configured to, with the at least one processor, cause the apparatus to:
select, from the plurality of data blocks, a set of data blocks for verifying the data integrity of the file, wherein respective ones of the set of data blocks comprises the at least one copy and the tag generated based on the at least one copy;
determine a verification parameter for each of the set of data blocks; and
generate the challenge message comprising verification parameters of the set of data blocks and an indication of the set of data blocks.

14. The apparatus of claim 13, wherein the proof on the data integrity of the file comprises:
a tag proof generated based on the tags comprised by respective ones of the set of data blocks;
a data block proof generated based on respective copies of the set of data blocks and the verification parameters of the set of data blocks; and
respective hash values of the set of data blocks.

15. The apparatus of claim 14, wherein the at least one memory and the computer program codes are configured to, with the at least one processor, cause the apparatus to:
determine whether the tag proof, the data block proof and the hash values of the set of data blocks satisfy a predetermined relationship;
in response to the predetermined relationship being satisfied, determine that the proof is valid; and
in response to the proof being valid, determine a success in verifying the data integrity of the file.

16. The apparatus of claim 15, wherein the at least one memory and the computer program codes are further configured to, with the at least one processor, cause the apparatus to:
in response to the predetermined relationship being unsatisfied, determine that the proof is invalid; and
in response to the proof being invalid, determine a failure in verifying the data integrity of the file.

17. The apparatus of claim 12, wherein the audit server is separate from the user device, and wherein the at least one memory and the computer program codes are configured to, with the at least one processor, cause the apparatus to:
in response to receiving from the user device a first request for verifying the data integrity of the file stored at the storage server, generate the challenge message; and
in response to the data integrity of the file being verified, send, to the user device, a response to the first request, the response indicating a verification result of the data integrity of the file.

18. An apparatus of a storage server, the apparatus comprising:
at least one processor; and
at least one non-transitory memory including computer program codes;
the at least one non-transitory memory and the computer program codes are configured to, with the at least one processor, cause the apparatus to:

receive, by a storage server from an audit server, a challenge message for verifying data integrity of a file stored at the apparatus by a user device, the file comprising a plurality of data blocks, each data block comprising at least one copy and having a tag generated based on the at least one copy, and a number of the at least one copy is based on a maximum number of copies supported for a respective data block of the plurality of data blocks, the maximum number of copies determined based on an importance of the respective data block;

generate, by the storage server based on the challenge message, a first proof on the data integrity of the file; and send, by the storage server, the first proof to the audit server.

19. The apparatus of claim 18, wherein the at least one memory and the computer program codes are further configured to, with the at least one processor, cause the apparatus to:

prior to receiving the challenge message, receive, from the user device, respective copies of the plurality of data blocks, respective tags of the plurality of data blocks and a first file signature of the file, wherein the respective tags of the plurality of data blocks and the first file signature are generated based on the copies of the plurality of data blocks and a first private key of the user device;

verify validity of the tags of the plurality of data blocks and the first file signature; and in response the tags of the plurality of data blocks and the first file signature being valid, store the file at the apparatus by storing the copies of the plurality of data blocks, the tags of the plurality of data blocks and the first file signature.

20. The apparatus of claim 19, wherein the at least one memory and the computer program codes are further configured to, with the at least one processor, cause the apparatus to:

determine hash values for respective ones of the plurality of data blocks;

in response to the file being stored at the apparatus, generate a second file signature for the file based on the hash values and a second private key of the apparatus obtained from a key generation center; and send the second file signature to the user device.

* * * * *